United States Patent [19]

Danell

[11] 3,969,605

[45] July 13, 1976

[54] THERMAL PULSE TYPE HEATER FOR COOLANT SYSTEMS AND THE LIKE

[75] Inventor: Russell D. Danell, Winnipeg, Canada

[73] Assignee: James B. Carter Limited, Winnipeg, Canada

[22] Filed: Jan. 23, 1975

[21] Appl. No.: 543,308

[30] Foreign Application Priority Data

Jan. 29, 1974 United Kingdom ................. 4036/74

[52] U.S. Cl. .......................... 219/208; 123/142.5 E; 137/519.5; 137/533.11; 219/306; 219/314; 417/207

[51] Int. Cl.² ...................... F02N 17/06; H05B 1/00; F24H 1/10; F16K 15/04

[58] Field of Search ........... 219/314, 202, 205, 208, 219/306; 123/142.5 R, 142.5 E; 417/207, 208, 209; 137/533.11, 533.13, 533.15, 539, 519, 519.5

[56] References Cited

UNITED STATES PATENTS

| | | | |
|---|---|---|---|
| 1,596,520 | 8/1926 | Eskholme et al. | 137/533.13 X |
| 2,105,893 | 1/1938 | Salmonsen | 137/533.11 |
| 2,440,610 | 4/1948 | Kimberlin | 219/208 |
| 2,568,474 | 9/1951 | Van Sciver | 219/314 X |
| 2,663,248 | 12/1953 | Johnson | 99/300 X |
| 2,926,234 | 2/1960 | Palmer | 219/314 |
| 3,285,001 | 11/1966 | Turnblade | 417/208 X |
| 3,626,148 | 12/1971 | Woytowich | 417/208 X |

*Primary Examiner*—A. Bartis
*Attorney, Agent, or Firm*—Stanley G. Ade

[57] ABSTRACT

A reservoir has an electrical heating element therein connectable to a power line and the reservoir is connected in series with a coolant carrying hose which in turn is connected to the coolant system of an automobile engine or the like. The reservoir is provided with an inlet connection and an outlet connection both situated adjacent the upper side of the reservoir. The inlet connection has a one-way valve allowing coolant in only, and includes a ball which has a specific gravity less than the specific gravity of the coolant so that the ball floats in the coolant and closes off the inlet connection when the coolant level is adjacent the upper side of the reservoir. The outlet connection has a one-way valve allowing coolant out only and includes a ball which has a specific gravity greater than the specific gravity of the coolant so that the ball normally engages the valve seat and is only displaced if and when the pressure of the coolant and/or the air in the air space above the coolant level increases. When the coolant level drops due to the expulsion of some of the coolant through the outlet, coolant flows into the reservoir through the inlet connection and the coolant reduces the temperature of the coolant within the reservoir thus allowing more coolant to be drawn into the inlet valve until the level rises whereupon the inlet valve closes and the cycle is repeated.

8 Claims, 1 Drawing Figure

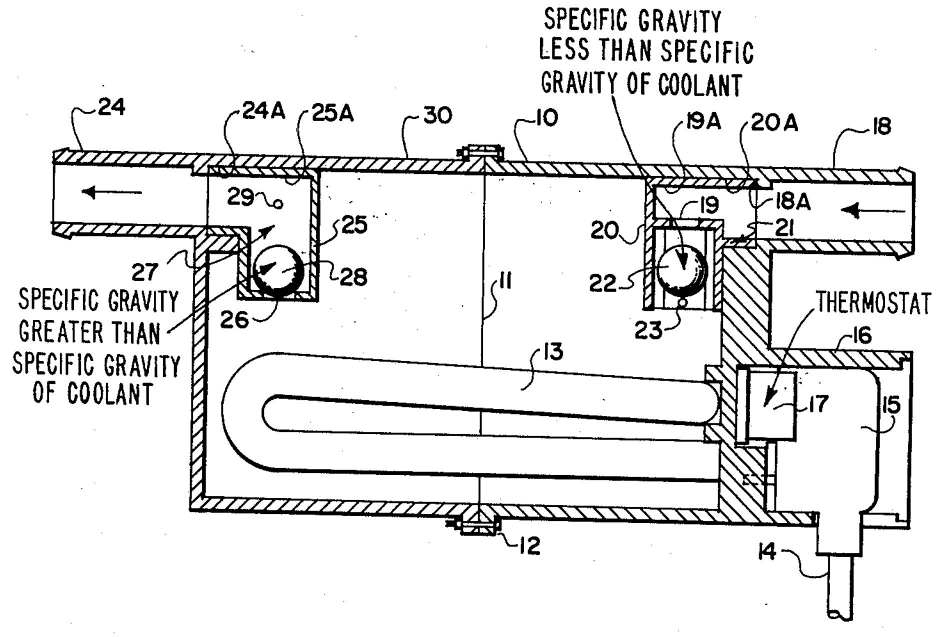
SPECIFIC GRAVITY
LESS THAN SPECIFIC
GRAVITY OF COOLANT
24
24A
25A
30
10
19A
20A
18
18A
29
25
28
27
26
20
19
21
22
23
11
SPECIFIC GRAVITY
GREATER THAN
SPECIFIC GRAVITY
OF COOLANT
THERMOSTAT
16
13
17
15
12
14

THERMAL PULSE TYPE HEATER FOR COOLANT SYSTEMS AND THE LIKE

BACKGROUND OF THE INVENTION

This invention relates to new and useful improvements in pre-heaters for the coolant of a liquid cooled automobile engine or the like.

The use of coolant heaters is widespread in areas experiencing relatively cold ambient temperatures particularly in the winter months and three types of heaters are currently available for incorporation in the cooling system of automobile engines.

Imersion heaters consist of an element which is inserted within the cooling system and heats the coolant when the element is connected to a source of electrical energy.

Tank type heaters are relatively small reservoirs inserted in series or parallel with the coolant system with a heater element within the reservoir to heat the coolant therein. Once again the heating element is connected to a source of electrical energy.

Thermal pulse-type heaters are used which include a pair of intermittently operating one-way valves and a heater element connected to a source of electrical energy whereby the pressure difference within the heater operates the valves intermittently.

The immersion heater is normally installed within the block of the engine whereas the other two types are installed into the lines of the cooling system.

All of these devices suffer from several disadvantages and the present invention overcomes disadvantages inherent with these heaters and provided a heater for coolant which is efficient, easy to install and which includes the necessary safety devices.

SUMMARY OF THE INVENTION

The principal object and essence of the invention is to provide a heater of the character herewithin described which consists of a one-way valve at the outlet end, a heating element connectable to a source of electrical energy, a reservoir, a fluid level control valve adjacent the inlet to the reservoir and which may incorporate an over temperature control device incorporated into the supply cord.

Another object of the invention is to provide a device of the character herewithin described which is easily installed within a coolant hose of the cooling engine of an automobile engine or the like.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

The drawing is a side sectional elevation of the device.

DETAILED DESCRIPTION

Proceeding therefore to describe the invention in detail, the device consists of a substantially cylindrical reservoir 10 which is preferably made in two portions normally secured together around the flanged joining surface 11, by means of bolts 12 or the like thus allowing assembly of the device during manufacture.

A conventional heating element 13 is situated within the reservoir 10 adjacent the lower side thereof and is connected to a source of electrical energy (not illustrated) by means of a line cord 14. This line cord incorporates a plug assembly 15 engageable within a cylindrical shroud 16 on one end of the reservoir and preferably incorporates an over temperature control device in the form of a thermostat 17 as clearly described in Canadian Patent No: 850,765, issued Sept. 1, 1970.

A cylindrical inlet connection 18 is situated at one end of the reservoir 10 and adjacent the upper side thereof, communicating with a valve seat 19 which in turn communicates with a vertically situated cylindrical shroud 20 carrying a fluid level control valve 21. The valve consists of a plastic ball valve element 22 movable freely within the shroud 20 and below the valve seat 19, and adapted to close off the inlet 18 when the ball engages with the valve seat 19 from the underside thereof. A pin 23 retains the ball valve element within the shroud. The valve seat is preferably formed at the base of a cylindrical portion or sleeve 19A which engages within a bore 20A and abuts against a shoulder 18A formed at the inner end of the inlet connection 18 and the shroud 20 may be formed integrally with the sleeve and extends at right angles therefrom.

The plastic ball element 22 is manufactured from a material having a specific gravity less than the specific gravity of the coolant normally used within an automobile engine so that under normal circumstances, the ball element floats in the coolant. This means that if the reservoir is full of coolant, the ball element is engaged against the seat 19 thus closing off the inlet 18.

An cylindrical outlet connection 24 is provided at the opposite end of the reservoir and communicates with a shroud 25 having a valve seat 26 at the lower side thereof. A one-way valve 27 consists of a plastic ball 28 movable freely within the shroud 25, upward movement being restricted by means of a pin 29 as clearly shown. When in the lowermost position shown in the drawing, the ball 28 engages the seat 26 and closes off the outlet 24. This shroud is preferably formed integrally with and at right angles to a cylindrical portion 26A which engages within a bore 25A and abuts against a shoulder 24A formed at the inner end of the outlet connection 24.

This ball is manufactured with a specific gravity greater than the specific gravity of the coolant so that normally it sinks if the reservoir is full of coolant thus closing off the outlet as shown due to the engagement of the ball 28 with the valve seat 26.

In its initial stage, and after proper installation in series with a coolant hose (not illustrated), it will be observed that both the inlet and outlet connections 18 and 24 are in the uppermost portion relative to the body of the reservoir with the element 13 adjacent the lower portion of the reservoir. The reservoir normally will be full of coolant due to the circulation of the coolant by the conventional pump and when the element is activated by connection of the line cord 14 to a source of electrical energy, the coolant inside the reservoir heats up and expands. The pressure generated causes the coolant to open the one-way valve 27 by lifting the ball 28 from the seat 26 so that some coolant flows through the outlet connection 24 due to expansion of the coolant. As the pressure in the whole system builds up, the coolant in the reservoir starts to boil and therefore vaporize and this causes the level of the liquid in the reservoir to fall. It will be observed that the valve seat 19 is spaced below the upper side 30 of the reservoir so that provided the level of coolant is above this valve seat, the ball 22 is in the uppermost position thus closing off the inlet. However, when the level of the coolant falls below the level of the valve seat 19 the ball 22 sinks with the coolant level so that, fresh coolant is allowed in causing the temperature in the reservoir to fall. This reduces the pressure and allows a further flow of coolant into the reservoir and when pressure equilibrium is obtained, both the outlet and inlet valves close so that the cycle repeats itself. It will of course be appreciated that with the reservoir full, the expansion of the coolant causes coolant to flow only through the outlet as the fluid control valve 21 acts as a back check valve thus preventing the back flow of coolant.

When the coolant in the entire system has been heated sufficiently, the incoming fluid will not cool the reservoir enough to permit further fluid to enter. This causes over heating in the reservoir and the over temperature control thermostat 17 will operate to shut off the element 13 until the reservoir cools down sufficiently. However, this will only occur in exceptional cases when the ambient temperature is relatively high.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A heater for the coolant of liquid cooled automotive engines and the like comprising in combination a coolant reservoir, a heater element therein operatively connected to a source of electrical energy, an inlet connection and an outlet connection in said reservoir adjacent the upper side thereof, whereby said reservoir may be operatively connected to the coolant system of said engine, said inlet connection including a fluid level, one-way control valve assembly adapted to allow coolant to enter said reservoir, said outlet connection including a one-way valve assembly adapted to allow coolant to leave said reservoir, said inlet valve assembly including a valve seat, a ball valve element below said seat engageable with said seat when said inlet valve assembly is in the closed position, said ball valve element having a specific gravity less than the specific gravity of the coolant whereby said ball valve element floats in said coolant and moves away from said valve seat when the level of coolant drops within said reservoir and moves into engagement with said valve seat when the level of coolant rises within said reservoir, said one-way control valve assembly in said inlet connection including a horizontally situated cylindrical sleeve engageable within a bore forming the inner end of said inlet connection, and a substantially cylindrical shroud extending downwardly substantially at right angles to said sleeve, said valve seat being situated between said sleeve and said shroud and at the upper end of said shroud whereby said shroud communicates with said sleeve, said ball valve element moving freely vertically within said shroud, and means restraining the displacement of said ball valve element from the lower open end of said shroud.

2. The heater according to claim 1 in which said outlet valve assembly includes a valve seat and a ball valve element above said valve seat, said last mentioned ball valve element having a specific gravity greater than the specific gravity of said coolant whereby said valve element is normally biased into engagement with said valve seat, an increase in pressure within said reservoir overcoming the bias and displacing said last mentioned valve element from said last mentioned valve seat.

3. The heater according to claim 2 in which said outlet valve assembly includes a horizontally situated cylindrical sleeve engageable within a bore forming the inner end of said outlet connection, and a substantially cylindrical shroud extending downwardly substantially at right angles to said sleeve, said valve seat in said outlet valve assembly being situated at the lower open end of said shroud, said ball valve element in said outlet valve assembly moving freely vertically within said shroud, and means spanning said shroud adjacent the upper end thereof restraining the displacement of said ball valve element of said outlet valve assembly from said shroud and into said cylindrical sleeve.

4. The heater according to claim 3 which includes a thermostat operatively connected to said element and responsive to the temperature of the coolant within said reservoir to disconnect said element from the source of electrical energy when the temperature of said coolant within said reservoir reaches a predetermined maximum and to connect said element with said source of electrical energy when the temperature of the coolant within said reservoir reaches a predetermined minimum.

5. The heater according to claim 2 which includes a thermostat operatively connected to said element and responsive to the temperature of the coolant within said reservoir to disconnect said element from the source of electrical energy when the temperature of said coolant within said reservoir reaches a predetermined maximum and to connect said element with said source of electrical energy when the temperature of the coolant within said reservoir reaches a predetermined minimum.

6. The heater according to claim 1 in which said outlet valve assembly includes a horizontally situated cylindrical sleeve engageable within a bore forming the inner end of said outlet connection, and a substantially cylindrical shroud extending downwardly substantially at right angles to said sleeve, a valve seat in said outlet valve assembly situated at the lower open end of said shroud, said ball valve element in said outlet valve assembly moving freely vertically within said shroud, and being normally biased into engagement with said last mentioned valve seat whereby an increase in pressure within said reservoir overcomes the bias and displaces said last mentioned ball valve element away from said last mentioned valve seat, and means spanning said shroud adjacent the upper end thereof restraining the displacement of said ball valve element of said outlet valve assembly from said shroud and into said cylindrical sleeve.

7. The heater according to claim 6 which includes a thermostat operatively connected to said element and responsive to the temperature of the coolant within said reservoir to disconnect said element from the source of electrical energy when the temperature of said coolant within said reservoir reaches a predetermined maximum and to connect said element with said source of electrical energy when the temperature of the coolant within said reservoir reaches a predetermined minimum.

8. The heater according to claim 1 which includes a thermostat operatively connected to said element and responsive to the temperature of the coolant within said reservoir to disconnect said element from the source of electrical energy when the temperature of said coolant within said reservoir reaches a predetermined maximum and to connect said element with said source of electrical energy when the temperature of the coolant within said reservoir reaches a predetermined minimum.

* * * * *